US011163299B2

(12) United States Patent
Ogawa et al.

(10) Patent No.: US 11,163,299 B2
(45) Date of Patent: Nov. 2, 2021

(54) CONTROL DEVICE, CONTROL METHOD, AND PROGRAM RECORDING MEDIUM

(71) Applicant: NEC Corporation, Tokyo (JP)

(72) Inventors: Masatsugu Ogawa, Tokyo (JP); Masumi Ichien, Tokyo (JP); Masafumi Emura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 271 days.

(21) Appl. No.: 16/463,464

(22) PCT Filed: Dec. 5, 2017

(86) PCT No.: PCT/JP2017/043613
§ 371 (c)(1),
(2) Date: May 23, 2019

(87) PCT Pub. No.: WO2018/105599
PCT Pub. Date: Jun. 14, 2018

(65) Prior Publication Data
US 2019/0354113 A1    Nov. 21, 2019

(30) Foreign Application Priority Data

Dec. 7, 2016    (JP) .............................. JP2016-237840

(51) Int. Cl.
*G05D 1/00*    (2006.01)
*G07C 5/00*    (2006.01)
(Continued)

(52) U.S. Cl.
CPC ......... *G05D 1/0005* (2013.01); *G05D 1/0088* (2013.01); *G05D 1/0291* (2013.01);
(Continued)

(58) Field of Classification Search
CPC ...... G05D 1/0005; G05D 1/10; G05D 1/0088; G05D 1/0291; G05D 1/104; G05D 1/00;
(Continued)

(56) References Cited

U.S. PATENT DOCUMENTS 6,032,097 A * 2/2000 Iihoshi ................. G05D 1/0293
701/96
7,908,040 B2    3/2011 Howard et al.
(Continued)

FOREIGN PATENT DOCUMENTS

EP    2927131 A1    10/2015
JP    4617293 B2    1/2011
(Continued)

OTHER PUBLICATIONS

Kohei Kawakami, et al., "Self-organization of action control architecture for multi-agent system", Proceedings of the 25th Annual Conference of the Robotics Society of Japan, Sep. 13, 2007, Particularly "3. Action control architecture", Fig. 1, Table 2 (4 pages total).
(Continued)

*Primary Examiner* — Yonel Beaulieu
(74) *Attorney, Agent, or Firm* — Sughrue Mion, PLLC

(57) ABSTRACT

Provided is a control device which controls at least one of unmanned vehicles forming a group of unmanned vehicles that includes one vehicle, the control device acquires information on a state of another vehicle, calculates comparison values for plural kinds of actions by using acquired information on the one vehicle and the another vehicle, selects an action that the one vehicle is to take, based on comparison values for the plural kinds of actions, calculates an operation amount of the one vehicle by using information on an selected action and acquired information on a state of the another vehicle, and sets an operation setting value of an
(Continued)

actuator for operating the one vehicle by using the calculation result.

12 Claims, 7 Drawing Sheets

(51) Int. Cl.
| | | |
|---|---|---|
| *G07C 5/02* | (2006.01) | |
| *G07C 5/08* | (2006.01) | |
| *B64C 39/02* | (2006.01) | |
| *G05D 1/10* | (2006.01) | |
| *G05D 1/02* | (2020.01) | |

(52) U.S. Cl.
CPC .................. *G05D 1/10* (2013.01); *G07C 5/02* (2013.01); *G07C 5/08* (2013.01)

(58) Field of Classification Search
CPC ... G07C 5/02; G07C 5/08; G07C 5/00; G08G 1/09; G08G 1/00; G08G 1/16; B64C 19/02; B64C 39/02; F41H 13/00
See application file for complete search history.

(56) References Cited

U.S. PATENT DOCUMENTS

| | | | | |
|---|---|---|---|---|
| 9,274,524 | B2* | 3/2016 | Anderson | G05D 1/0231 |
| 2006/0015215 | A1 | 1/2006 | Howard et al. | |
| 2011/0046837 | A1 | 2/2011 | Khosla et al. | |
| 2015/0301529 | A1 | 10/2015 | Pillai et al. | |
| 2018/0074516 | A1* | 3/2018 | Ogawa | G05D 1/0094 |
| 2018/0284285 | A1* | 10/2018 | Curatu | G01S 7/4816 |
| 2018/0329429 | A1* | 11/2018 | Yamaguchi | G08G 1/202 |
| 2019/0176968 | A1* | 6/2019 | Ogawa | G05D 1/00 |

FOREIGN PATENT DOCUMENTS

| | | |
|---|---|---|
| JP | 4926958 B2 | 5/2012 |
| JP | 5271772 B2 | 8/2013 |
| JP | 5559671 B2 | 7/2014 |
| WO | 2005/076967 A2 | 8/2005 |

OTHER PUBLICATIONS

Ryo Tagawa, et al., "Reinforcement learning of state evaluation functions in soccer agents", Proceedings of the 20th Game Programming Workshop 2015, Particularly "3. agent2d and chain action", Fig. 1 , pp. 78-83 (6 pages total).
International Search Report in International Application No. PCT/JP2017/043613, dated Feb. 27, 2018.
Written Opinion in International Application No. PCT/JP2017/043613, dated Feb. 27, 2018.
Extended European Search Report for EP Application No. EP17878748.7 dated Oct. 31, 2019.

* cited by examiner

CONTROL DEVICE, CONTROL METHOD, AND PROGRAM RECORDING MEDIUM

This application is a National Stage Entry of PCT/JP2017/043613 filed on Dec. 5, 2017, which claims priority from Japanese Patent Application 2016-237840 filed on Dec. 7, 2016, the contents of all of which are incorporated herein by reference, in their entirety.

TECHNICAL FIELD

The present invention relates to a control device, a control method, and a program, which are for controlling actions of unmanned vehicles forming a group of unmanned vehicles.

BACKGROUND ART

An unmanned vehicle that is operated autonomously is applied to various fields, such as a robot moving autonomously for cleaning a room, a robot to be operated in an environment in which a human cannot be active easily, and a drone flying autonomously. Further, in addition to an autonomous operation of one unmanned vehicle, an example of autonomously operating a plurality of unmanned vehicles has been reported.

PTL 1 discloses an article operation system using a plurality of autonomously-movable drive units and a plurality of transferable stock trays.

Particularly, a technology for searching for a search object with a plurality of unmanned vehicles is actively researched in a defense-related field. In general, such an unmanned vehicle is referred to as an unmanned x vehicle (UxV). In a case of an unmanned aircraft, the UxV is referred to as an unmanned air vehicle (UAV). Similarly, in a case of an unmanned vessel, the UxV is referred to as an unmanned surface vehicle (USV), and in a case of an unmanned underwater vessel, the UxV is referred to as an unmanned undersea vehicle (UUV).

The unmanned vehicle as described above is broadly classified into two types including a centralized-control type unmanned vehicle operated remotely by a human and an autonomously-operated type unmanned vehicle operated autonomously by an installed program. Technically, an autonomously-operated type unmanned vehicle, which is operated autonomously by a program installed in the unmanned vehicle without human intervention and performs various actions and labor instead of a human, is desired. Thus, the unmanned vehicle is demanded to perform work instead of a human, and artificial intelligence to be mounted on the unmanned vehicle is actively researched and developed.

PTL 2 discloses an automatic search system, which searches for a search object by using a plurality of unmanned vehicles operated autonomously and cooperatively.

In order to operate the unmanned vehicle wisely, the unmanned vehicle is required to change actions autonomously according to a situation. In general, the unmanned vehicle has a plurality of missions (also referred to as actions) in many cases, and is required to change an action according to a situation.

For example, in a case of an unmanned vehicle for a defense purpose, a dangerous article is searched in the first place. When a dangerous article is found, the unmanned vehicle chases the dangerous article in a case where the dangerous article moves, and captures the dangerous article in some cases. In other words, such an unmanned vehicle changes actions of searching, chasing, capturing, and the like as appropriate according to a situation. With the current system, actions are switched by a human remotely in many cases. However, in the future, it is desired that the unmanned vehicle determines a situation autonomously and switches the actions automatically.

PTL 3 discloses a train operation control method that enables traveling methods to be changed autonomously according to an operation situation of one train. Further, PTL 4 discloses a traveling control support method in which an on-vehicle device installed in a train and a crossing control device communicate wirelessly, an arriving time of the train at a crossing and a brake pattern of the train are estimated, and a traveling control pattern of the train is calculated based on estimation results. In the technologies of PTLs 3 and 4, a state transition is set in advance, and actions of the train are switched automatically based on IF-THEN condition determination.

CITATION LIST

Patent Literature

[PTL 1] Japanese Patent No. 4617293
[PTL 2] Japanese Patent No. 4926958
[PTL 3] Japanese Patent No. 5271772
[PTL 4] Japanese Patent No. 5559671

SUMMARY OF INVENTION

Technical Problem

PTLs 1 and 2 disclose an examination on a technology in which a single unmanned vehicle or a group of a plurality of unmanned vehicles performs a single operation autonomously. However, PTLs 1 and 2 do not disclose an effective method regarding a technology in which the group of unmanned vehicles switches actions autonomously.

When a state transition diagram is used as described in PTLs 3 and 4, a single unmanned vehicle enables actions of searching, chasing, and capturing to be switched. However, in order to achieve an autonomous operation of the group of unmanned vehicles, it is required that the switching of actions of one vehicle in the group and the switching of actions of the entire group of unmanned vehicles be made consistent. Thus, it is difficult for a single independent vehicle belonging to the group of unmanned vehicles to switch actions autonomously. For example, an unmanned vehicle near an object cannot determine to switch to the action of chasing only by the one vehicle in order to achieve an autonomous operation of the group of unmanned vehicles. This is because, in a case where another unmanned vehicle is closer to the object than the one vehicle, it is more effective for the entire group of unmanned vehicles when the another unmanned vehicle performs the action of chasing.

Further, in some cases, it is more effective that a plurality of vehicles in the group of unmanned vehicles perform the action of chasing. However, it cannot be determined how the one vehicle belonging to the group of unmanned vehicles acts only by using a simple IF-THEN rule with the state transition diagram. In other words, the actions cannot be switched optimally as the group of unmanned vehicles, simply by using the state transition diagram as in PTLs 3 and 4.

An object of the present invention is to solve the above-mentioned problems and to provide a control device capable of optimizing actions of an entire group of unmanned vehicles while each of vehicles forming the group of unmanned vehicles selects the actions autonomously.

Solution to Problem

A control device according to one aspect of the present invention, which controls at least one of unmanned vehicles forming a group of unmanned vehicles, includes: an other vehicle information acquisition means configured to acquire information on a state of another vehicle; an action comparison means configured to acquire information on the state of the another vehicle from the other vehicle information acquisition means, acquire a sensor signal containing information on a state of one vehicle, and calculate comparison values for a plurality of kinds of actions that the one vehicle is to take by using the acquired information on the one vehicle and the another vehicle; an action selection means configured to select an action that the one vehicle is to take, based on the comparison values for the plurality of kinds of actions, which are calculated by the action comparison means; an operation amount calculation means configured to calculate an operation amount of the one vehicle by using information on the action selected by the action selection means and information on the state of the another vehicle, which is acquired from the other vehicle information acquisition means; and an operation setting means configured to set an operation setting value of an actuator for operating the one vehicle by using the calculation result from the operation amount calculation means.

A control method according to one aspect of the present invention is a control method of controlling at least one of unmanned vehicles forming a group of unmanned vehicles, and includes: acquiring information on a state of another vehicle; acquiring a sensor signal containing information on a state of one vehicle; calculating comparison values for a plurality of kinds of actions that the one vehicle is to take by using the acquired information on the one vehicle and the another vehicle; selecting an action that the one vehicle is to take, based on the calculated comparison values for the plurality of kinds of actions; calculating an operation amount of the one vehicle by using information on the selected action and information on the state of the another vehicle; and setting an operation setting value of an actuator for operating the one vehicle by using the calculation result.

A program according to one aspect of the present invention is a program for controlling at least one of unmanned vehicles forming a group of unmanned vehicles, and causes a computer to execute: processing of acquiring information on a state of another vehicle; processing of acquiring a sensor signal containing information on a state of one vehicle; processing of calculating comparison values for a plurality of kinds of actions that the one vehicle is to take by using the acquired information on the one vehicle and the another vehicle; processing of selecting an action that the one vehicle is to take, based on the calculated comparison values for the plurality of kinds of actions; processing of calculating an operation amount of the one vehicle by using information on the selected action and information on the state of the another vehicle; and processing of setting an operation setting value of an actuator for operating the one vehicle by using the calculation result.

Advantageous Effects of Invention

According to the present invention, it is possible to provide a control device capable of optimizing actions of an entire group of unmanned vehicles while each of vehicles forming the group of unmanned vehicles selects the actions autonomously.

EXAMPLE EMBODIMENT

Now, description is made on example embodiments of the present invention by using the drawings. In the example embodiments described below, limitations technically preferred for carrying out the present invention are given, but the scope of the present invention is not limited to the following. Note that, in all the drawings referred in the description of the example embodiments below, similar components are denoted with the same symbols unless otherwise specified. Further, in the following example embodiments, repeated description for similar configurations and actions may be omitted in some cases.

First Example Embodiment

Now, with reference to the drawings, description is made on a control device according to a first example embodiment of the present invention.

The control device according to this example embodiment is provided correspondingly to each of unmanned vehicles that form a group of unmanned vehicles. The control device according to this example embodiment controls at least one of unmanned vehicles that form the group of unmanned vehicles. The control device acquires information on each corresponding vehicle from a sensor (not illustrated)

mounted on one vehicle, and acquires information on each uncorresponding vehicle through communication with another vehicle.

Note that the control device according to this example embodiment may not be provided to a single unmanned vehicle, but may be provided in such a way as to correspond to a plurality of unmanned vehicles. For example, a single control device is capable of corresponding to a plurality of unmanned vehicles by dividing processing by the control device correspondingly to the plurality of unmanned vehicles in a time-sharing manner and performing serial processing. Further, for example, the single control device is capable of corresponding to the plurality of unmanned vehicles by causing a plurality of arithmetic devices to share the processing by the control device and performing parallel processing.

The control device according to this example embodiment acquires information on the one vehicle from the sensor mounted on the one vehicle, acquires information on the other vehicles through communication with the other vehicles, and calculates an operation amount of the one vehicle by using the acquired information on the one vehicle and the other vehicles.

Figure 1:
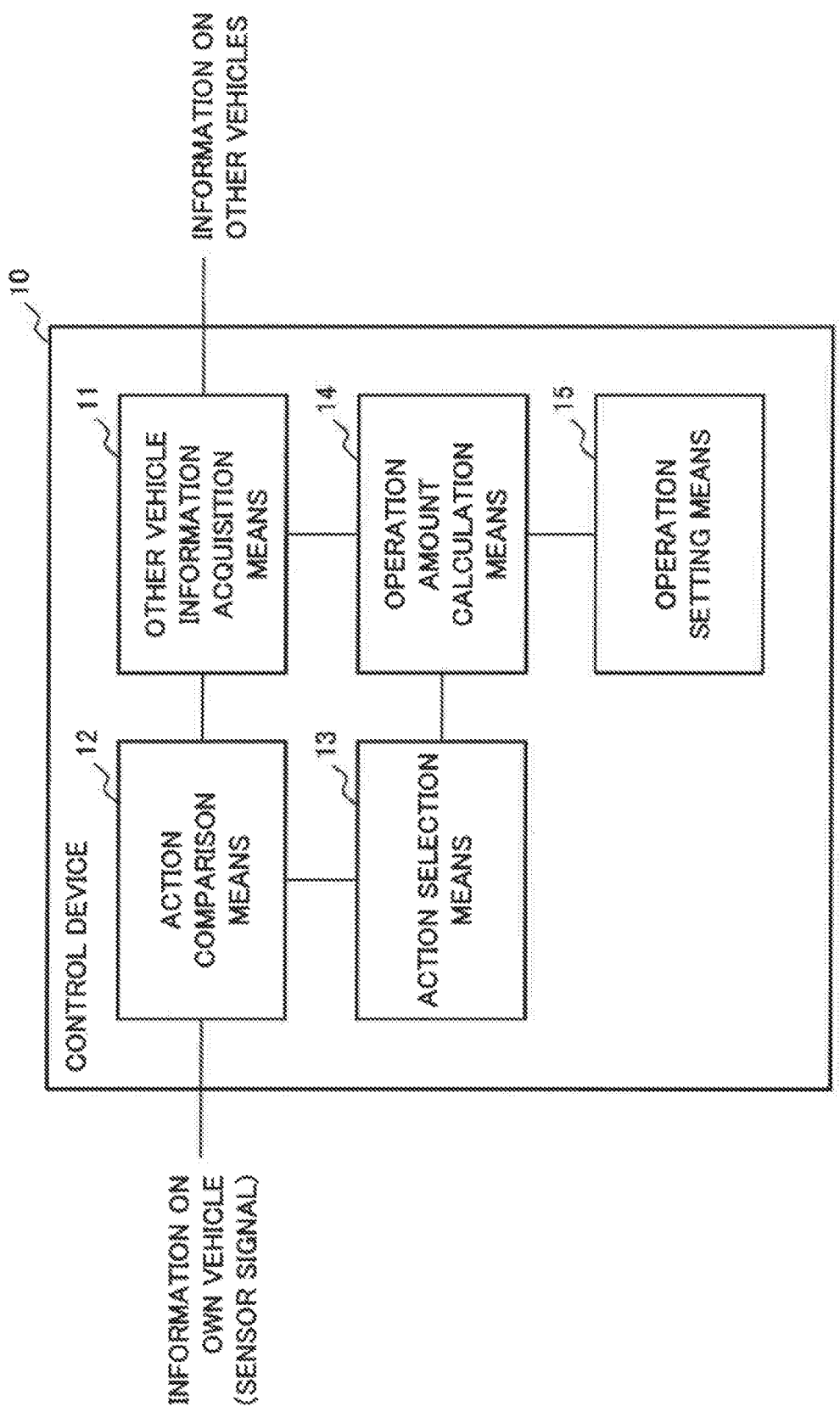
FIG. 1 is a block diagram for illustrating a configuration of a control device according to a first example embodiment of the present invention.

FIG. 1 is a block diagram for illustrating a configuration of a control device 10 according to this example embodiment. As illustrated in FIG. 1, the control device 10 includes an other vehicle information acquisition means 11, an action comparison means 12, an action selection means 13, an operation amount calculation means 14, and an operation setting means 15.

The other vehicle information acquisition means 11 acquires information on states of the other vehicles from the communicable vehicles located in the vicinity of the one vehicle. Note that, in this example embodiment, the vicinity refers to within a predetermined range in the periphery of the one vehicle. While the other vehicle information acquisition means 11 of each vehicle communicates with the other vehicles located in the vicinity (within the predetermined range), information on each vehicle is mutually transmitted and received. The predetermined range may be set within a space having an outer periphery defined by a circle or a sphere, or may be set within a space having a deformable outer periphery.

Specifically, the other vehicle information acquisition means 11 acquires evaluation values of the actions of the plurality of unmanned vehicles as a whole (hereinafter, referred to as evaluation functions), or information associated with the evaluation functions. The evaluation functions are functions that are amounts regarding action purposes of the entire unmanned vehicles and are set for each of a plurality of kinds of actions. Note that the plurality of kinds of actions include, for example, searching, chasing, and capturing of a search object, improvement of a communication situation with the other vehicles, and the like. However, the actions of the unmanned vehicles are not limited to the examples given here, and may be set in conformity with usage conditions of the unmanned vehicles.

The action comparison means 12 acquires, from a sensor, a sensor signal related to a state of the one vehicle, such as a positional information, velocity, and an operation setting value of the one vehicle. The action comparison means 12 calculates comparison values for the plurality of actions to be taken by the one vehicle by using the acquired sensor signal, a setting value set for the one vehicle, and the information on the states of the other vehicles, which is acquired by the other vehicle information acquisition means 11. In the following example, an example in which the action comparison means 12 calculates an evaluation function improvement degree as a comparison value based on the evaluation function value set for each vehicle is given.

For example, for each of the plurality of actions ("N" refers to the number for the actions), the action comparison means 12 generates an evaluation function A(N) for the operation amount of the one vehicle and evaluation functions B(N) for operation amounts of the other vehicles located in the vicinity, which are calculated based on the information on the states of the other vehicles located in the vicinity. Sequentially, the action comparison means 12 calculates an evaluation function improvement degree F(N) when the unmanned vehicle takes an action N by using the evaluation function A(N) and the evaluation functions B(N). Note that the evaluation function A(N) for the operation amount of the one vehicle is also referred to as a first evaluation function, and the evaluation functions B(N) for the operation amounts of the other vehicles in the vicinity are also referred to as second evaluation functions.

In general, the evaluation function A(N) and the evaluation functions B(N) are functions each indicating an amount by which the unmanned vehicle is intended to be controlled. In this example embodiment, as the evaluation function A(N) and the evaluation functions B(N), functions each indicating the operation amount of the unmanned vehicle are assumed.

The evaluation function improvement degree F(N) is obtained by, for example, calculating a difference between values of the evaluation functions or a difference between differentials of the evaluation functions with the value of the one vehicle as a reference. In this example embodiment, an example in which the differentials of the evaluation functions are used for obtaining the evaluation function improvement degree F(N) is given. In a case where the differentials of the evaluation functions are used, room for improvement of the evaluation functions can be evaluated directly regardless of absolute values of the evaluation functions.

The action selection means 13 selects an action to be taken by the one vehicle, based on the comparison values of the plurality of kinds of actions, which are calculated by the action comparison means 12. The simplest function of the action selection means 13 is selecting an action, based on a magnitude correlation of the comparison values. In this example embodiment, the action selection means 13 selects an action having the largest evaluation function improvement degree F(N).

The action selection means 13 may select the action by using a method other than the method of comparing the evaluation function improvement degrees F(N). For example, the action selection means 13 may select the action by performing comparison after multiplying the comparison value of each action by a weight factor. Further, when there is a correlation with another action, the action selection means 13 may perform comparison after forming an arithmetic expression using a value of the other action. In other words, the action selection means 13 selects the action by comparing the actions that the one vehicle may take by using some index.

The operation amount calculation means 14 calculates the operation amount of the one vehicle by using the information on the action of the one vehicle, which is selected by the action selection means 13, and the information on the states of the other vehicles, which are acquired from the other vehicle information acquisition means 11.

For example, the operation amount calculation means 14 sets some rule for each action, and exercises the rule for the action selected by the action selection means 13. In this example embodiment, it is required to determine operation amounts of the group of unmanned vehicles for the selected action, besides an operation amount (also referred to as an action amount) of the single unmanned vehicle. Therefore, the operation amount calculation means 14 determines the operation amount for the selected action by using the information on the states of the other vehicles, which is acquired by the other vehicle information acquisition means 11.

The operation amount calculation means 14 determines the operation amount by using the evaluation function. The evaluation function can be regarded as information indicating a state of the unmanned vehicle, and may be an index of an action standard as the group of unmanned vehicles (also referred to as a purpose of the group). Thus, according to the method of this example embodiment, the action as the group can be optimized.

The operation setting means 15 sets an operation setting value of an actuator (not illustrated) for operating the one vehicle by using the calculation result acquired by the operation amount calculation means 14.

Operation Amount Calculation Processing

Here, description is made on an example in which the operation amount calculation means 14 performs specific processing in a case where the action of the unmanned vehicle is searching or chasing. When a search theory is employed, evaluation functions for a search action and a chasing action can be set by maximizing a searching probability. This is equivalent to performing control of the group of unmanned vehicles with the purpose of the plurality of unmanned vehicles as a whole as the searching probability of the search object and performing control of maximizing the evaluation function value. Note that the purpose of the plurality of unmanned vehicles as a whole is a value to be maximized with the entire group of unmanned vehicles, and is expressed with an evaluation function value.

An existence probability density of the search object is expressed with Expression 1 in the following.

$$g(x, y, z, x_t, y_t, z_t) \qquad (1)$$

In Expression 1, "x," "y," and "z" indicate a freely selective position coordinate, and "$x_t$," "$y_t$," and "$z_t$," indicate a position coordinate of the search object.

As the evaluation function for searching, an area in which the group of unmanned vehicles is active (hereinafter, referred to as an active area) is divided into subareas, the number of which is the same as the number of the unmanned vehicles. A model having the following shape is used. More specifically, in the model, a center of the subarea divided for each unmanned vehicle is set as a peak, and the existence probability density is reduced toward a periphery of the subarea. In the entire active area, such evaluation functions having a plurality of peaks protruding upward are acquired. In other words, the action comparison means 12 calculates the evaluation functions (first and second evaluation functions) with a feature of a protruding shape. Subsequently, the operation amount calculation means 14 calculates the operation amount by using the evaluation functions with the feature of the protruding shape, which are calculated by the action comparison means 12. By setting those evaluation functions as described above, it is possible for the unmanned vehicles to take an action of spreading thoroughly in the entire active area and to perform searching in the entire active area.

Meanwhile, as the evaluation function for chasing, a model having the following shape is used. More specifically, in the model, a position at which a search object is recently found is set as a peak, and the existence probability density is reduced as going away from the position of the search object. By setting the function as described above, the action of the unmanned vehicle is changed to chasing.

Further, a probability that each unmanned vehicle finds a search object (hereinafter, referred to as a finding probability) is expressed with Expression 2.

$$p_i(\varphi_i) \qquad (2)$$

Here, "$\varphi_i$" indicates a searching effort provided to an unmanned vehicle i. Note that the searching effort may be regarded as an operation amount.

In many cases, the finding probability is changed depending on an environment in which each unmanned vehicle is present. For example, it is known that the finding probability in a case where the search object is found by a sonar under the sea is expressed with Expression 3.

$$p_i = 1 - e^{-\gamma_i \cdot \varphi_i} \qquad (3)$$

In Expression 3, "$\gamma_i$," indicates an amount depending on radio wave propagation, i.e., an amount changed by a medium of a space in which the unmanned vehicle is present. As a coefficient in Expression 3, it is desired that a value suitable for an environment in which the unmanned vehicle be always used.

As in Expression 4 in the following, the searching probability of the search object for each unmanned vehicle can be expressed with a product of the existence probability density of the search object and the finding probability of the unmanned vehicle. Note that, in Expression 4, "$x_i$," "$y_i$," and "$z_i$," each indicate a position coordinate of the unmanned vehicle i.

$$f_i = g(x_i, y_i, z_i, x_t, y_t, z_t) \cdot p_i(\varphi_i) \qquad (4)$$

Therefore, a searching probability of the plurality of unmanned vehicles as a whole (also referred to as an overall searching probability) is expressed with Expression 5 in the following.

$$\sum_i g(x_i, y_i, z_i, x_t, y_t, z_t) \cdot p_i(\varphi_i) \qquad (5)$$

In consideration of energy of the unmanned vehicle, the searching effort needs to be considered to be finite. Therefore, the overall searching probability is maximized with respect to a fixed searching effort, which is put into the entire group of unmanned vehicles. In other words, the searching probability is increased as much as possible with respect to the finite searching effort. In this example embodiment, a searching effort $\Psi$, which is put into the entire group of unmanned vehicles per unit time, is set, and the searching probability is maximized based on the set searching effort $\Psi$.

The operation amount calculation means 14 determines the operation amount of the one vehicle by solving an optimization problem of maximizing the overall searching probability in Expression 5 under a constraint condition for the searching effort $\Psi$ expressed in Expression 6 in the following.

$$\Psi = \sum_i \varphi_i \qquad (6)$$

In the case where the action of searching is selected, the operation amount calculation means 14 determines an operation amount of each vehicle by calculating which of the unmanned vehicles are moved to what extent in order to maximize the search possibility of the plurality of unmanned vehicles as a whole with the above-mentioned finite searching effort as a whole. In other words, the operation amount calculation means 14 determines the operation amount of the one vehicle by solving the optimization problem under the constraint condition that a total sum of the searching efforts, which are put into the vehicles per unit time, is equivalent to the searching efforts, which are put into the entire group of unmanned vehicles per unit time.

Therefore, in the case of the above-mentioned example, the evaluation value for the purpose of the plurality of unmanned vehicles as a whole is a value obtained by Expression 4. Further, the information on the state, which is used additionally, is the positional information of the search object, the positional information of the unmanned vehicles, the searching effort, and the like. The operation amount calculation means 14 performs the above-mentioned formulation, and uses the following procedure in order to set the operation amount.

Thus, the operation amount calculation means 14 determines the operation amount of the one vehicle by considering the states of the evaluation functions of the other vehicles located in the vicinity in order to maximize the searching probability per unit searching effort.

For example, in a case where an increment of the searching probability of the one vehicle is larger than that of each of the other vehicles in the vicinity when the unit searching effort is put into the vehicles, the operation amount calculation means 14 determines to put the unit searching effort into the one vehicle in the following control step. In contrast, in a case where an increment of the searching probability of the one vehicle is smaller than those of the other vehicles in the vicinity, the operation amount calculation means 14 determines not to put the searching effort into the one vehicle in the following control step. Thus, the operation amount calculation means 14 is operated when the one vehicle has an increment of the searching probability larger than the other vehicles in the vicinity, whereas the operation amount calculation means 14 is not operated when the one vehicle has an increment of the searching probability smaller than the other vehicles in the vicinity.

The searching probability per unit searching effort is equivalent to the differential of the evaluation function. Therefore, when repeating the operation of determining an operation amount in such a way that the searching probability per unit searching effort is increased to be maximum, the differentials of the evaluation functions are equal for all the unmanned vehicles. Thus, it is also effective to determine the operation amount in order to equalize the differentials of the evaluation functions.

According to the above-mentioned procedure, when a certain unmanned vehicle is to determine the operation amount of the one vehicle, the unmanned vehicle is not required to acquire the state information of all the unmanned vehicles forming the group of unmanned vehicles, and can determine an operation amount close to the overall purpose by using only the state information of the adjacent unmanned vehicles. In the case of controlling the unmanned vehicle, the operation setting value is required to be set as a vector quantity having three-dimensional directions, instead of a scalar quantity. Therefore, the operation setting means 15 distributes the operation amount, which is determined in the above-mentioned procedure, into outputs in three-dimensional directions, and sets a final operation setting value.

The operation setting means 15 determines operation directions by taking the following procedure. In other words, the operation setting means 15 regards the current position of the unmanned vehicle as a starting point, and forms a vector connecting the starting point and the position of the search object. Subsequently, the operation setting means 15 unitizes the formed vector (standardization into a vector having a length of 1), and sets the unit vector as an operation vector. When the length of the operation vector is set as the operation amount that is previously determined, the operation setting value for each direction can be acquired.

The operation determination method in the case of searching in the area in which the unmanned vehicles are active or the case of chasing a certain object is as described above. As other conceivable actions, an action in that a certain unmanned vehicle captures the object, an action of improving a communication situation in such a way that the communication with other unmanned vehicles is not interrupted, and the like are exemplified. When evaluation functions are set for those various actions similarly to the formulization for the action of searching, and an action is selected, the procedure of determining the operation setting value is executed similarly to the above-mentioned flow.

As a reference, a case where the number of other communicable vehicles located in the vicinity is set as an evaluation function when the communication situation is improved is exemplified. In this case, the evaluation function may be set in such a way that the value is increased as the number of other communicable vehicles increases.

For example, the number of other vehicles that are communicable with the one vehicle is indicated with "$m_i$" ("i" indicates the number of the one vehicle). In this case, Expression 7 in the following is conceivable for an evaluation function $h_i$. Note that "$\alpha_i$" is a coefficient.

$$h_i = 1 - e^{-\alpha_i \cdot m_i} \tag{7}$$

The operation amount calculation means 14 can allocate an optimized action to each vehicle, and optimize and operate the allocated action as a group together with the other vehicles to which the same action is allocated.

The operation amount of the unmanned vehicle, which is calculated by the operation amount calculation means 14, is converted by the operation setting means 15 into the operation setting value for the actuator that actually moves the unmanned vehicle. As a result, the unmanned vehicle can perform the operation estimated by the operation amount calculation means 14.

As described above, according to this example embodiment, the actions of the group of unmanned vehicles as a whole can be optimized while each vehicle belonging to the group of unmanned vehicles selects an action autonomously. In other words, according to this example embodiment, it is possible to cause the plurality of unmanned vehicles to perform a cooperative operation, to be active as the group of unmanned vehicles in an efficient formation, and to search the search object efficiently.

APPLICATION EXAMPLES

Here, description is made of the control device 10 according to this example embodiment by providing application examples. In the following, with reference to the drawings, detailed description is made on a case where efficiency of searching and chasing is maximized based on the search probability while the plurality of unmanned vehicles switch the two kinds of actions including searching and chasing of the search object.

Application Example 1

Figure 2:
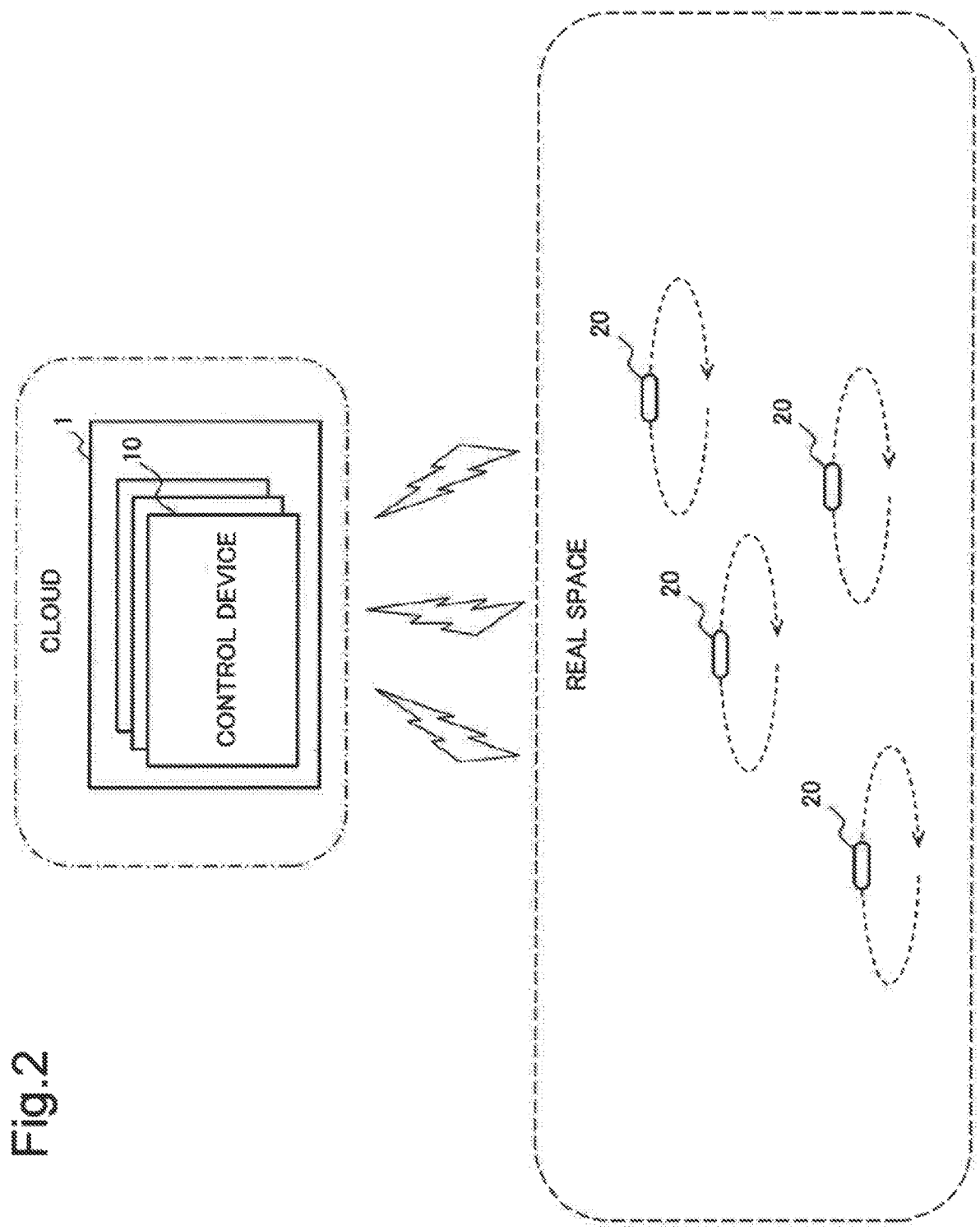
FIG. 2 is a conceptual diagram for illustrating an application example 1 of the control device according to the first example embodiment of the present invention.

FIG. 2 is a conceptual diagram for illustrating a system in an application example 1. In the application example 1, a central control system 1 for controlling a plurality of unmanned vehicles 20 that are operated in a real space is constructed on a cloud. In the example in FIG. 2, there is given an example in which the plurality of unmanned vehicles 20 are controlled by the central control system 1 to which a plurality of control devices 10 according to this example embodiment are provided. Note that, in this application example, the above-mentioned procedure relating to the control device 10 is used.

In this application example, there is given an example in which the unmanned vehicle 20 (UAV: Unmanned Air Vehicle) for performing an autonomous operation in the air and searching the search object with a radar is used. Note that this application example may be used for an unmanned surface vehicle (USV) or an unmanned undersea vehicle (UUV).

In this application example, the control device 10 corresponding to each unmanned vehicle 20 is disposed virtually on the cloud. Further, each control device 10 issues a control command to the unmanned vehicle 20 corresponding to the one vehicle while exchanging information with the virtual control devices 10 corresponding to the unmanned vehicles 20 in the vicinity as if the unmanned vehicle 20 exchanges the information with the unmanned vehicles 20 in the vicinity.

In this application example, the unmanned vehicle 20 takes two kinds of actions including searching of the search object in the active area and chasing of the search object found in the active area.

As the evaluation function used in this application example, the same expression as Expression 4 described above is set. In the case of the action of searching, a model, which is formed of a plurality of Gaussian-type peaks, is used. Each Gaussian-type peak is obtained by dividing the active area in which the group of unmanned vehicles is active by the number of the unmanned vehicles 20. The existence probability density is reduced toward the periphery from the peak, i.e., from the center of each divided subarea. In the case of the action of chasing the search object, the following Gaussian-type function is used. More specifically, in the Gaussian-type function, a position at which the search object is recently found is set as a peak, and the existence probability density is reduced as going away from the peak. Further, a finding possibility $p_i$ of each unmanned vehicle 20 is obtained with Expression 3.

"$\gamma_i$" in Expression 3 differs according to an airspace in which the unmanned vehicle 20 is present. Therefore, in this example embodiment, a method of compiling "$\gamma_i$" for each airspace in a database in advance and changing "$\gamma_i$" based on the positional information at which the unmanned vehicle 20 is present is adopted.

The other vehicle information acquisition means 11 uploads the positional information of a target captured by each unmanned vehicle 20 and the positional information of the one vehicle as appropriate as accompanying information that is used by the action comparison means 12 and the operation amount calculation means 14. The unmanned vehicles 20 are mutually operated in an asynchronous manner, and the uploaded information is also asynchronous.

Even when the central control system 1 is provided on the cloud, all the information is asynchronous and is not gathered in the central control system 1 and therefore, a normal optimization calculation relating to the searching probability cannot be performed. Thus, in this application example, the entire group of unmanned vehicles is optimized by using the procedure described regarding the first example embodiment.

Figure 3:
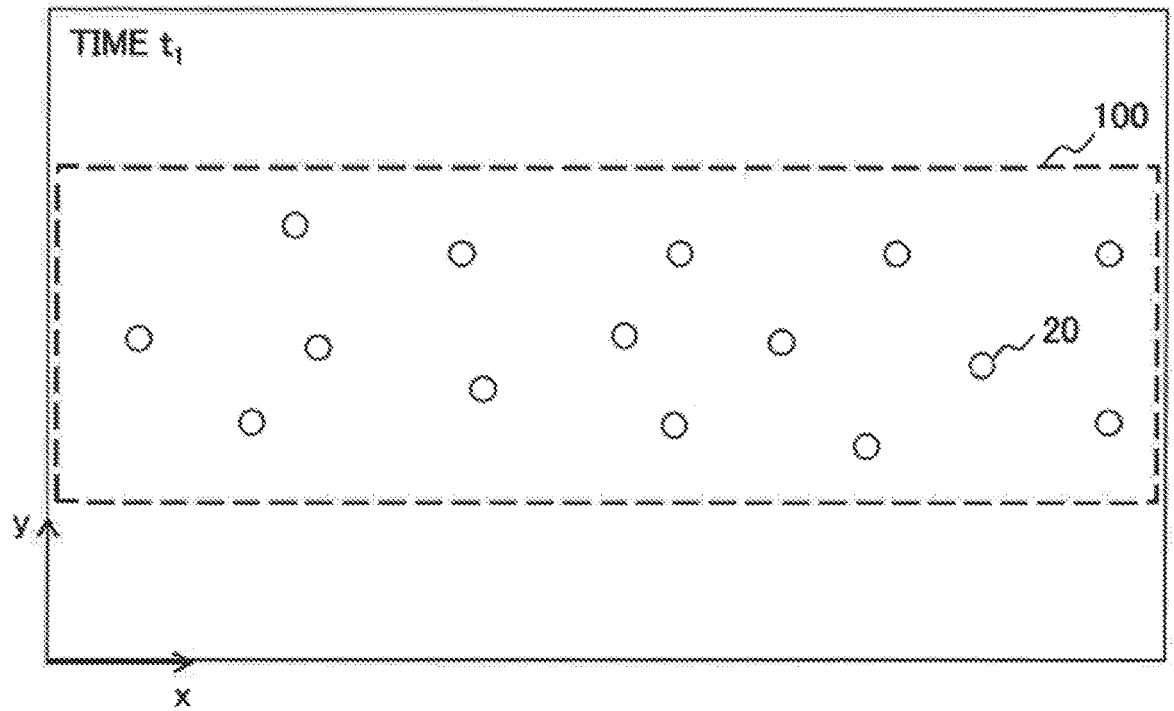
FIG. 3 is a conceptual diagram for illustrating an example of an arrangement situation in a search state of a group of unmanned vehicles, which are controlled in the application example 1 of the control device according to the first example embodiment of the present invention.
Figure 4:
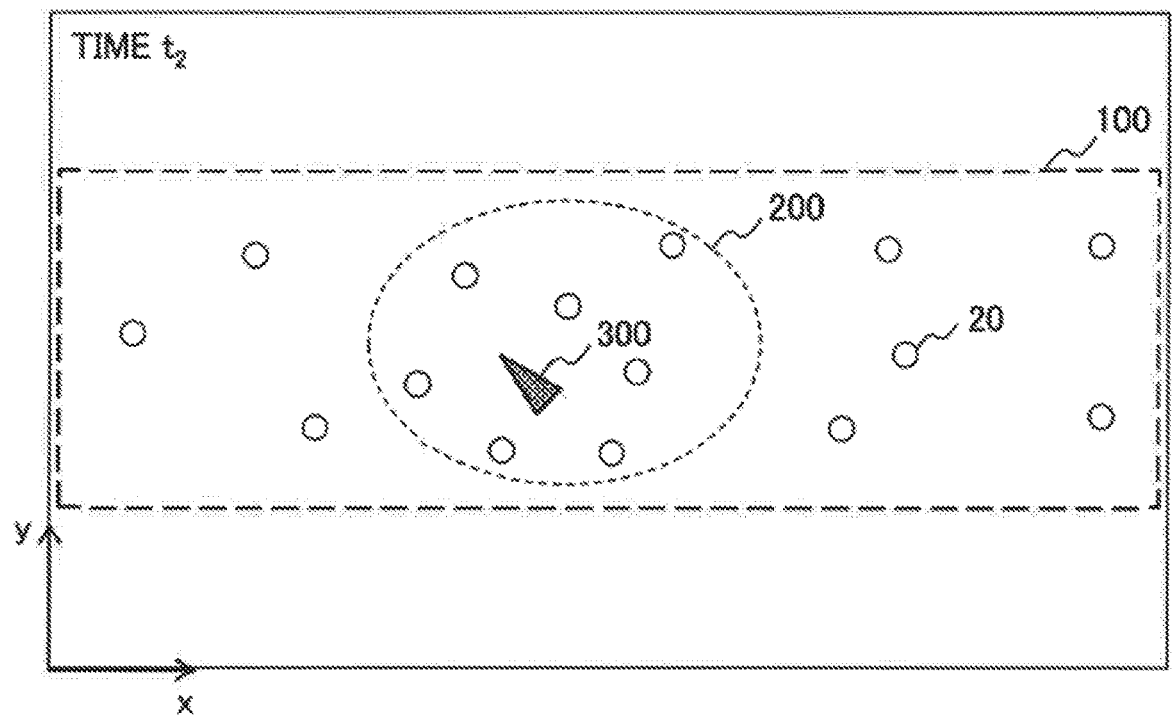
FIG. 4 is a conceptual diagram for illustrating an example of an arrangement situation in a case where some vehicles in the group of unmanned vehicles, which are controlled in the application example 1 of the control device according to the first example embodiment of the present invention, are shifted to a state of chasing an object.
Figure 5:
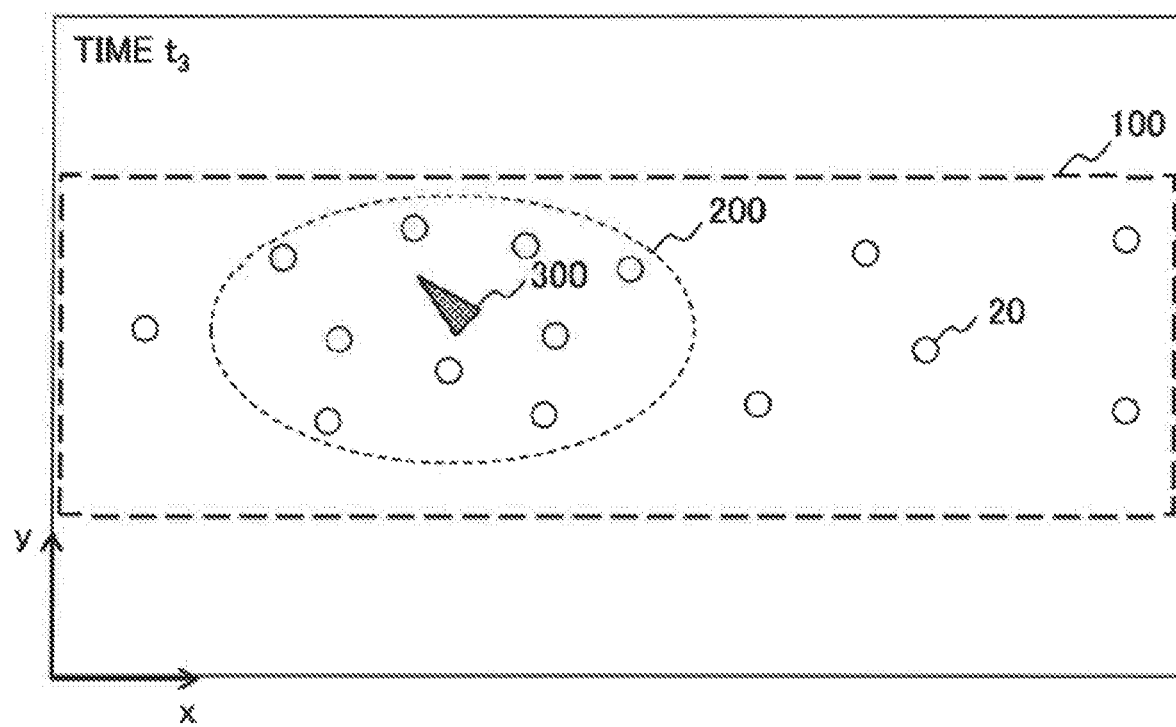
FIG. 5 is a conceptual diagram for illustrating another example of the arrangement situation in the case where some vehicles in the group of unmanned vehicles, which are controlled in the application example 1 of the control device according to the first example embodiment of the present invention, are shifted to the state of chasing the object.

FIGS. 3 to 5 are conceptual diagrams in which actual operations of the unmanned vehicles 20 are placed in a chronological order. FIG. 3, FIG. 4, and FIG. 5 are snapshots taken at a time $t_1$, a time $t_2$, and a time $t_3$, respectively. Provided that the time period elapses in the order of the time $t_1$, the time $t_2$, and the time $t_3$. An active area 100 is a space in which the unmanned vehicles 20 are supposed to be active. Note that, in FIGS. 3 to 5, the active area 100 is illustrated two-dimensionally, but the active area 100 has a three-dimensional spread in reality.

The snapshot at the time $t_1$ (FIG. 3) indicates a state in which the search object is not yet detected. In the state at the time $t_1$, the unmanned vehicles 20 spread evenly throughout the active area 100, and take the action of searching.

The snapshot at the time $t_2$ (FIG. 4) indicates a state in which a search object 300 is found after the time period elapses from the time $t_1$ to change the action of the unmanned vehicles 20 in the periphery of the search object 300 from searching to chasing. In the state at the time $t_2$, the unmanned vehicles 20 in a chasing region 200, which is surrounded by a closed curve of a broken line, switch to the action of chasing. In the state at the time $t_2$, the plurality of unmanned vehicles 20 located in the chasing region 200 takes the action of chasing in such a way as to surround the search object 300. The unmanned vehicles 20 outside the chasing region 200 continue searching in the active area 100 similarly at the time $t_1$. At the positions away from the search object 300, the unmanned vehicles 20 spread substantially evenly.

The snapshot at the time $t_3$ (FIG. 5) indicates a state in which the number of unmanned vehicles 20, which switch the action from searching to chasing, is increased in conformity to movement of the search object 300, as compared to the situation at the time $t_2$.

Here, a method of evaluation to what extent the group of unmanned vehicles is appropriately operated in the application example 1 is described. In this evaluation, the operation amount calculation means 14 determines the operation amount of each unmanned vehicle 20 in such a way as to efficiently increase the searching probability in chasing of the search object 300.

In this evaluation, comparison is made regarding the overall searching probability per unit searching effort between an operation in this application example and an operation in a comparative example in which the calculation of the operation amount performed by the operation amount calculation means 14 is intentionally stopped and the unmanned vehicles 20 are operated by a certain amount. In principle, since the searching probability has a property of increasing as the searching effort is put into the vehicle more, it is required that comparison be made regarding the value of the searching probability per searching effort that is put into the vehicle (per unit searching effort).

In the comparative example, when the calculation of the operation amount performed by the operation amount calculation means 14 is stopped, all the unmanned vehicles 20 are operated in such a way as to gradually approach the search object 300 by a certain amount. In contrast, in this application example, the unmanned vehicles 20 located in the chasing region 200 chase the search object 300.

As a result of this evaluation, when comparison is made with the comparative example, a result in which the overall searching probability per unit searching effort in this application example is higher by about 30% on an average is acquired. This indicates that the search object 300 can be chased efficiently according to the method in this application example.

As described above, according to the method in this application example, the actions as the group can be switched appropriately according to a situation through the central control system disposed on the cloud, and the plurality of actions can be performed as the group.

Application Example 2

Figure 6:
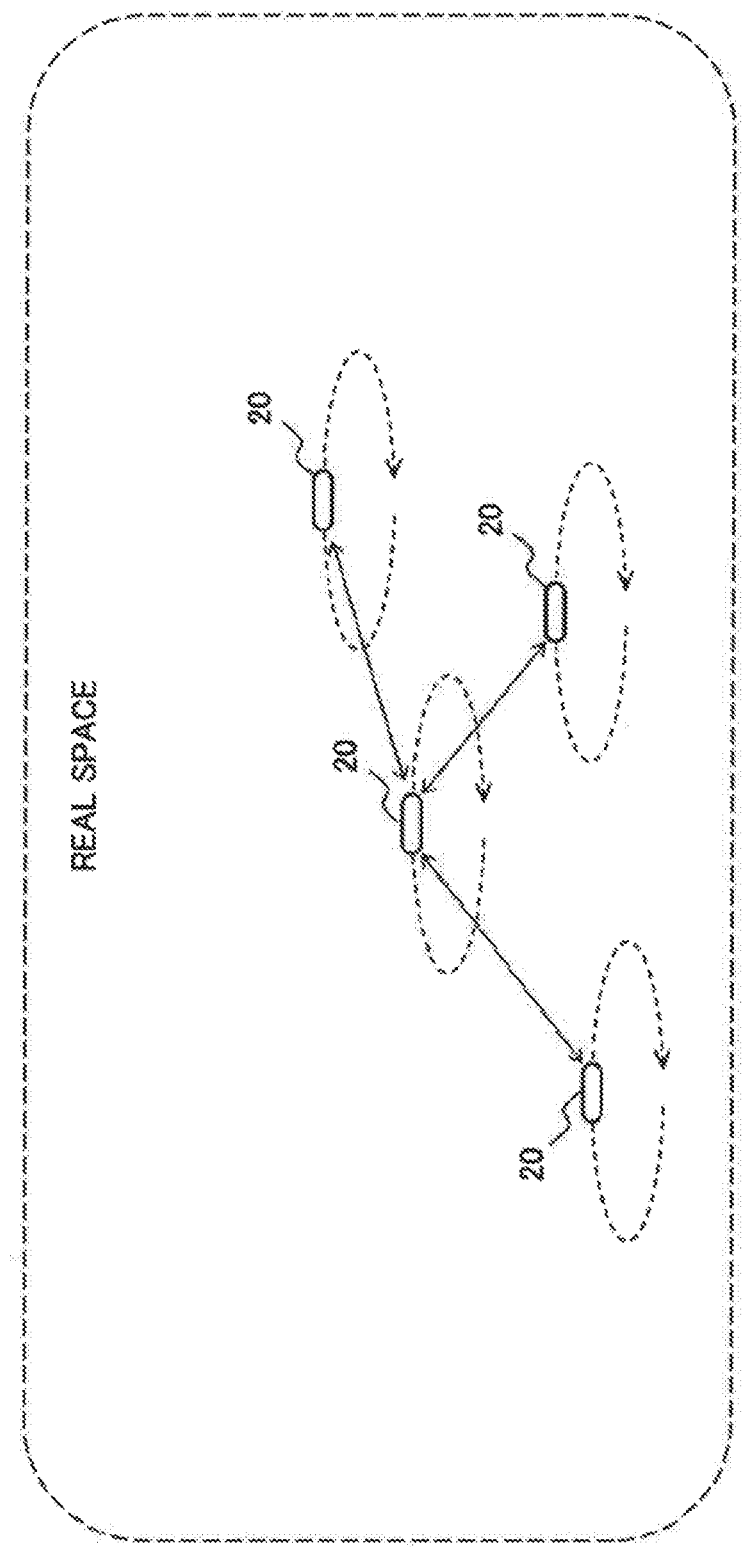
FIG. 6 is a conceptual diagram for illustrating an application example 2 of the control device according to the first example embodiment of the present invention.

FIG. 6 is a conceptual diagram for illustrating a system in an application example 2. In this application example, the control device 10 is mounted on each unmanned vehicle 20. Note that, in FIG. 6, the control device 10 mounted on the unmanned vehicle 20 is omitted.

In this application example, each unmanned vehicle 20 exchanges the information with the communicable unmanned vehicles 20 located in the vicinity, and receives control from the control device 10 mounted on the one vehicle to take an action autonomously and dispersedly. Further, this application example corresponds to a case where it is difficult to acquire the information from a field in which the group of unmanned vehicles is operated and where it is required to expect the group of unmanned vehicles to perform an autonomous and dispersive operation. Further, this application example corresponds to a case where it is difficult to expect the central control system 1 or a case where the central control system 1 does not function.

All conditions such as the unmanned vehicles 20 and the evaluation function that are used in this application example are the same as those in the application example 1. This application example is different from the application example 1 in that the information is not controlled collectively by the central control system.

The other vehicle information acquisition means 11 is mounted on the unmanned vehicle 20, and exchanges the information on the search object 300 with the other vehicles located in the vicinity.

Also in this application example, similarly to the application example 1, the evaluation is performed by searching the search object 300 and switching the action to chasing when the search object 300 is found. As a result, an evaluation result similarly to that in the application example 1 is acquired.

Further, also in this evaluation, similarly to the application example 1, comparison is made regarding the overall searching probability per unit searching effort between an operation in this application example and the operation in the comparative example in which the calculation of the operation amount performed by the operation amount calculation means 14 is intentionally stopped and the unmanned vehicles 20 are operated by a certain amount. As a result of the evaluation on the two examples, similarly to the application example 1, a result in which the overall searching probability per unit searching effort in this application example is higher by 30% than that in the comparative example can be acquired.

As described above, according to the method in this application example, even when the control device according to this example embodiment is mounted on each unmanned vehicle to perform control, the similar effects as in the application example 1 can be obtained.

In the application example 1 described above, the case where the central control system is implemented on the cloud is shown, but the central control system may be constructed as a special system. For example, a control center in which the central control system is disposed may be built, and the unmanned vehicles may be controlled via the control center. For example, the control center in which the central control system is disposed may be built on the shore to control a plurality of unmanned undersea vehicles (UUVs) or a plurality of unmanned surface vehicles (USVs). Further, for example, the plurality of UUVs or the plurality of USVs may be controlled by a mother ship on which the central control system is disposed. Further, for example, the control device according to this example embodiment is not limited to a UAV, a UUV, and a USV, and may be applied to any unmanned vehicles such as an aircraft type unmanned vehicle and a ground-running type unmanned vehicle.

Further, in the above-mentioned application examples, at the time of chasing the found search object, the control is performed in such a way as to maximize the searching probability, but the purpose and the value to be maximized are not limited to the searching probability and can be changed as appropriate. For example, the method in this example embodiment can be also used for a case where a transceiver is mounted on each unmanned vehicle and where the unmanned vehicles are controlled to form a formation in such a way that information is transmitted throughout the widest range at a desired transfer rate. In other words, the method in this example embodiment is applicable to utilization where a plurality of unmanned vehicles have a certain purpose and where a certain value is maximized. Further, in this example embodiment, description has been made on the example in which the two kinds of actions of searching and chasing are taken, but this example embodiment may be applied to three or more kinds of actions.

Second Example Embodiment

Figure 7:
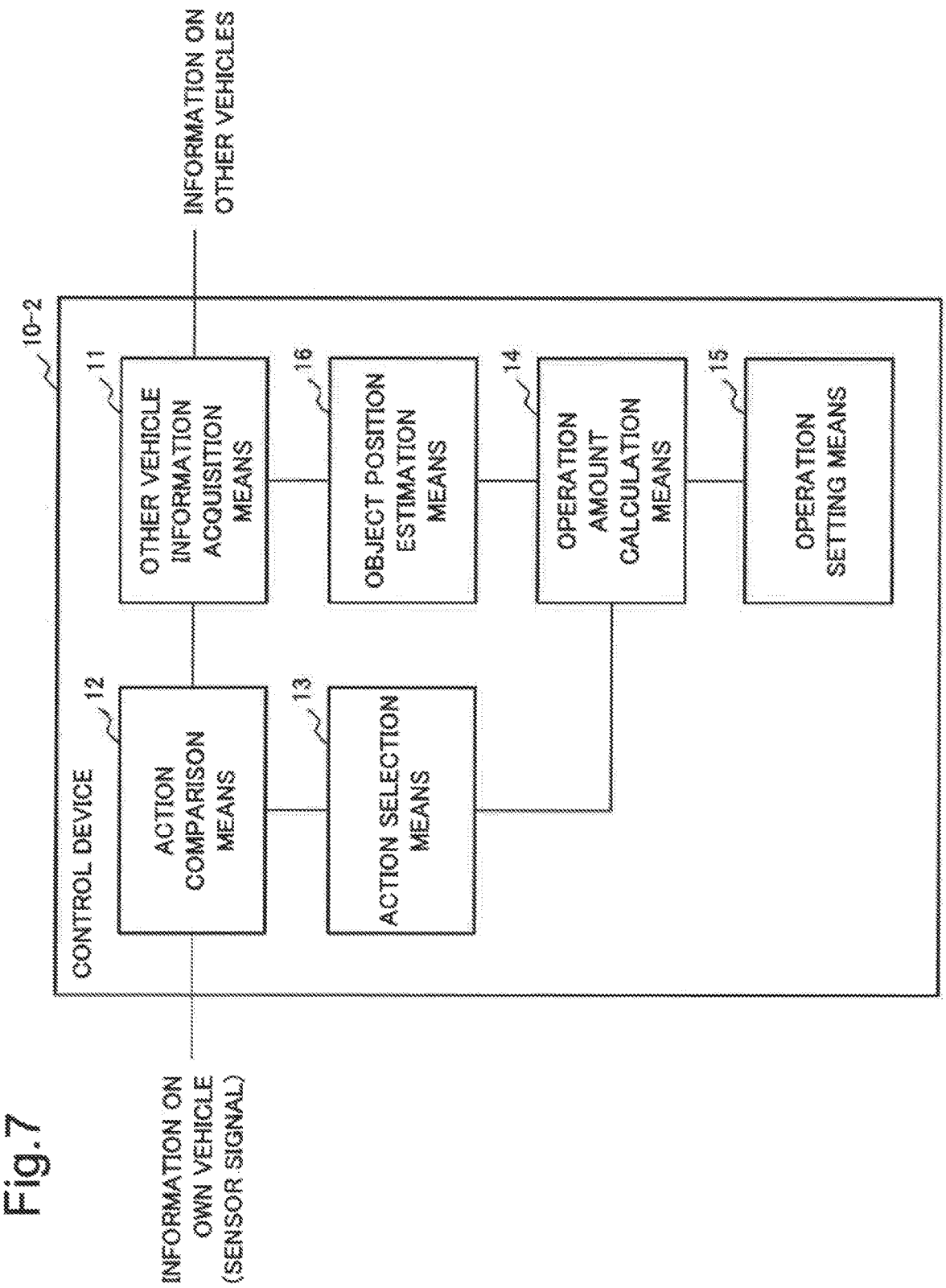
FIG. 7 is a block diagram for illustrating a configuration of a control device according to a second example embodiment of the present invention.

Next, with reference to the drawings, description is made on a control device according to a second example embodiment of the present invention. FIG. 7 is a block diagram for illustrating a configuration of a control device 10-2 according to this embodiment. As illustrated in FIG. 7, in addition to an other vehicle information acquisition means 11, an action comparison means 12, an action selection means 13, an operation amount calculation means 14, and an operation setting means 15, the control device 10-2 according to this example embodiment includes an object position estimation means 16. Note that, except for the object position estimation means 16, the control device 10-2 has a similar configuration to that of the control device 10 according to the first example embodiment.

The object position estimation means 16 acquires information on the search object, which is found by other vehicles, from the other unmanned vehicle information acquisition means 11, and estimates a current position of the search object, based on a position at which the search object is recently found. Note that the object position estimation means 16 may estimate the current position of the search object, based on information on the search object, which is found with a sensor mounted on one vehicle, or may estimate the position of the search object by integrating information acquired by the one vehicle and the other vehicles. The object position estimation means 16 outputs the estimated position of the search object to the operation amount calculation means 14.

Assuming that the search object is present at the position estimated by the object position estimation means 16, the operation amount calculation means 14 estimates the existence probability density, and calculates an operation amount of the one vehicle similarly to the first example embodiment.

As described above, according to this example embodiment, the operation amount of the one vehicle can be calculated based on the current position of the search object. Thus, the actions of the group of unmanned vehicles as a whole can be optimized efficiently in a more realistic manner.

Hardware

Figure 8:
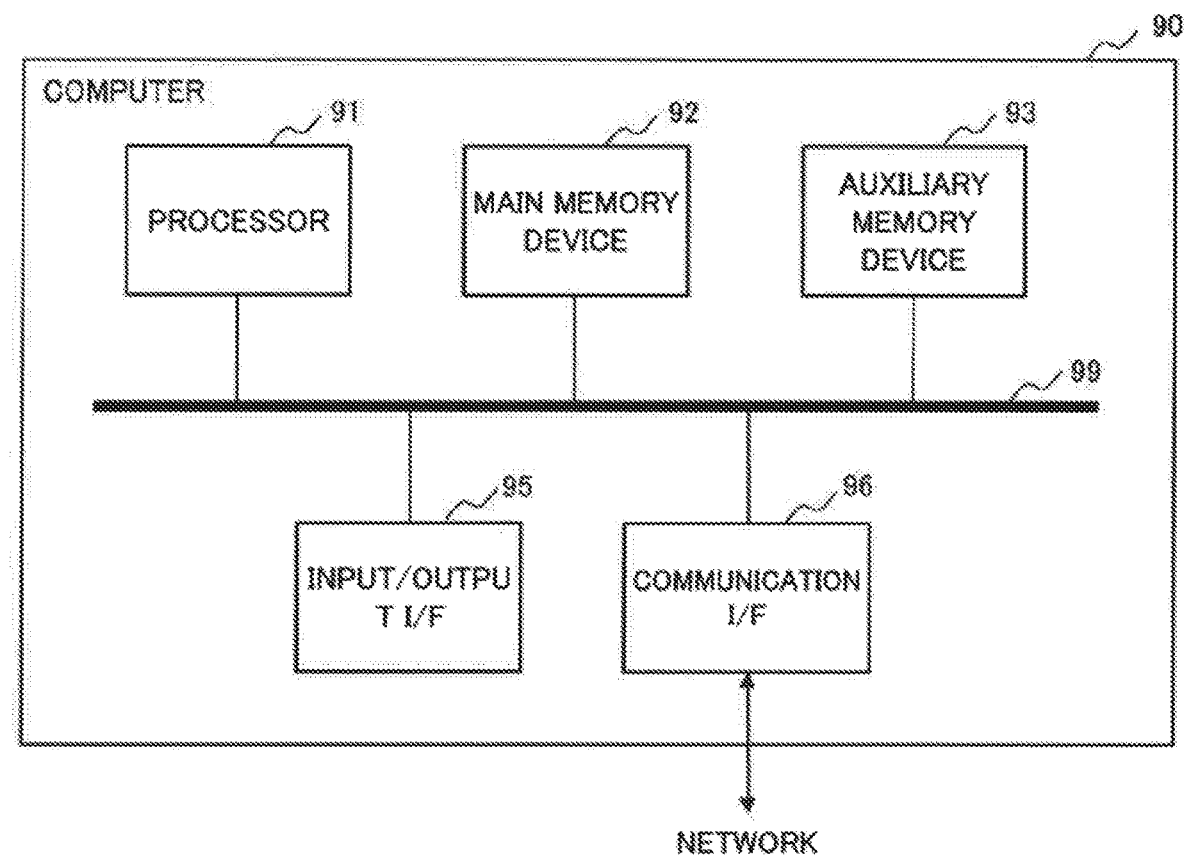
FIG. 8 is a block diagram for illustrating an example of a hardware configuration of the control device according to each example embodiment of the present invention.

Here, description is made on a hardware configuration that achieves a control system of the control device according to this example embodiment by exemplifying a computer 90 in FIG. 8 as one example. Note that the computer 90 in FIG. 8 is a configuration example for achieving the control device according to each of the example embodiments, and is not intended to limit the scope of the present invention.

As described in FIG. 8, the computer 90 includes a processor 91, a main memory device 92, an auxiliary memory device 93, an input/output interface 95, and a communication interface 96. In FIG. 8, the interface is expressed as "I/F" in an abbreviated form. The processor 91, the main memory device 92, the auxiliary memory device 93, the input/output interface 95, and the communication interface 96 are connected to each other via a bus 99 in such a way as to enable mutual data communication. Further, the processor 91, the main memory device 92, the auxiliary memory device 93, and the input/output interface 95 are connected to a network such as the Internet and the Intranet through the communication interface 96. For example, the computer 90 is connected to a system or a device, which is arranged in a cloud, or the unmanned vehicle through the network.

The processor 91 develops a program, which is stored in the auxiliary memory device 93 or the like, in the main memory device 92, and executes the developed program. This example embodiment may have a configuration using a software program installed in the computer 90. The processor 91 executes arithmetic processing and control processing which are executed by the control device according to this example embodiment.

The main memory device 92 has a region in which the program is developed. The main memory device 92 may be a volatile memory such as a dynamic random access memory (DRAM), for example. Further, a nonvolatile memory such as a magnetoresistive random access memory (MRAM) may be configured or added as the main memory device 92.

The auxiliary memory device 93 is a means for storing various data. The auxiliary memory device 93 is configured by a local disc such as a hard disc and a flash memory. Note that the main memory device 92 may be configured to store the various data, and the auxiliary memory device 93 may be omitted.

The input/output interface 95 is a device for connecting the computer 90 and peripherals to each other, based on connection standards of the computer 90 and the peripherals. The communication interface 96 is an interface for network connection such as the Internet and the Intranet, based on standards and specifications. The input/output interface 95 and the communication interface 96 may be shared as an interface for connecting to external devices.

The computer 90 may be configured in such a way as to be connected with input units such as a keyboard, a mouse, and a touch panel as needed. Those input units are used for inputting information and setting. Note that, in a case where the touch panel is used as an input unit, a display screen of a display unit may have a configuration to also function as an interface of the input unit. Data communication between the processor 91 and the input unit may be performed through the input/output interface 95.

The communication interface 96 is connected to an external system, a device, or the unmanned vehicle through the network.

Further, the computer 90 may be provided with a display unit for displaying information. In the case where the display unit is provided, it is preferred that the computer 90 be provided with a display control device (not illustrated) for controlling display of the display unit. The display unit may be connected to the computer 90 through the input/output interface 95.

Further, the computer 90 may be provided with a reader/writer as needed. The reader/writer is connected to the bus 99. Between the processor 91 and a recording medium (program recording medium), which is not illustrated, the reader/writer mediates reading of data and a program from the recording medium, writing of processing results from the computer 90 to the recording medium, and the like. The recording medium may be achieved by a semiconductor recording medium such as a secure digital (SD) card and a universal serial bus (USB) memory, and the like. Further, the recording medium may be achieved by a magnetic recording medium such as a flexible disc, an optical recording medium such as a compact disc (CD) and a digital versatile disc (DVD), and other recording media.

The hardware configuration for enabling the control device according to the example embodiment of the present invention is thus given above as one example. Note that the hardware configuration in FIG. 8 is merely an example of the hardware configuration for enabling the control device according to this example embodiment, and is not intended to limit the scope of the present invention. Further, a control program, which causes a computer to execute processing related to the control device according to this example embodiment, is also included in the scope of the present invention. Moreover, a program recording medium that records the control program according to the example embodiment of the present invention is also included in the scope of the present invention.

As in the above, the present invention is described with reference to the example embodiments. However, the present invention is not limited by the above-mentioned example embodiments. Various changes that a person skilled in the art can understand can be made to the configuration and details of the present invention within the scope of the present invention.

This application is based upon and claims the benefit of priority from Japanese Patent Application No. 2016-237840, filed on Dec. 7, 2016, the disclosure of which is incorporated herein in its entirety by reference.

REFERENCE SIGNS LIST

10 Control device
11 Other vehicle information acquisition means
12 Action comparison means 13 Action selection means
14 Operation amount calculation means
15 Operation setting means
16 Object position estimation means
20 Unmanned vehicle

What is claimed is:

1. A control device which controls, at least, one vehicle of unmanned vehicles forming a group of unmanned vehicles, the control device comprising:
one or more memories storing instructions; and
one or more processors connected to the one or more memories and configured to execute the instructions to:
acquire information on a state of another vehicle;
acquire a sensor signal containing information on a state of the one vehicle;
calculate comparison values for a plurality of kinds of actions that the one vehicle is configured to take by using acquired information on the one vehicle and the another vehicle;
select an action that the one vehicle is configured to take, based on the comparison values for the plurality of kinds of actions;
calculate an operation amount of the one vehicle by using information on the selected action and information on a state of another vehicle; and
set an operation setting value of an actuator for operating the one vehicle by using the calculated operation amount of the vehicle,
wherein the one or more processors are further configured to
generate, for each of the plurality of kinds of actions that the one vehicle is configured to take, a first evaluation function for the operation amount of the one vehicle, based on information on a state of the one vehicle, and a second evaluation function for an operation amount of the another vehicle, based on information on a state of the another vehicle, and calculate, as the comparison values, evaluation function improvement degrees at a time of taking the plurality of kinds of actions that the one vehicle is configured to take, based on the first evaluation function and the second evaluation function, and
select an action that the one vehicle is configured to take by comparing the evaluation function improvement degrees with each other, which are calculated for each of a plurality of actions that the one vehicle is configured to take.

2. The control device according to claim 1, wherein the one or more processors configured to
calculate the evaluation function improvement degree by using a difference between a differential value of the first evaluation function and a differential value of the second evaluation function.

3. The control device according to claim 1, wherein the one or more processors configured to
calculate the first evaluation function and the second evaluation function with a feature of a protruding shape, and
calculate the operation amount of the one vehicle by using the first evaluation function and the second evaluation function with a feature of a protruding shape.

4. The control device according to claim 1, wherein the one or more processors configured to
calculate the operation amount of the one vehicle by solving an optimization problem for maximizing an overall searching probability acquired by summing up searching probabilities of all the unmanned vehicles forming the group of unmanned vehicles, each of the searching probabilities being a product of a probability that each of the unmanned vehicles forming the group of unmanned vehicles finds a search object and an existence probability density of the search object at a position of each of the unmanned vehicles.

5. The control device according to claim 4, wherein the one or more processors configured to
solve the optimization problem under a constraint condition that a total sum of a searching effort put into each of the unmanned vehicles per unit time is equivalent to the searching effort put into the entire group of unmanned vehicles per unit time.

6. The control device according to claim 4, wherein the one or more processors configured to
set the operation setting value, based on the operation amount, when an increment of the searching probability of the one vehicle is larger than that of the another vehicle, and
be prevented from setting the operation setting value, when an increment of the searching probability of the one vehicle is smaller than that of the another vehicle.

7. The control device according to claim 6, wherein the one or more processors configured to
estimate a current position of the search object, based on a position at which the search object is recently found; and
calculate the operation amount of the one vehicle while assuming that the search object is present at the estimated current position of the search object.

8. A control method of controlling, at least, one vehicle of unmanned vehicles forming a group of unmanned vehicles, the control method comprising:
acquiring information on a state of another vehicle;
acquiring a sensor signal containing information on a state of one vehicle;
calculating comparison values for a plurality of kinds of actions that the one vehicle is configured to take by using acquired information on the one vehicle and the another vehicle;
selecting an action that the one vehicle is configured to take, based on calculated comparison values for a plurality of kinds of actions;
calculating an operation amount of the one vehicle by using information on the selected action and information on a state of the another vehicle; and
setting an operation setting value of an actuator for operating the one vehicle by using the calculated operation amount of the one vehicle,
wherein the calculating comparison values comprises generating, for each of the plurality of kinds of actions that the one vehicle is configured to take, a first evaluation function for the operation amount of the one vehicle, based on information on a state of the one vehicle, and a second evaluation function for an operation amount of the another vehicle, based on information on a state of the another vehicle, and calculating, as the comparison values, evaluation function improvement degrees at a time of taking the plurality of kinds of actions that the one vehicle is configured to take, based on the first evaluation function and the second evaluation function, and
wherein the selecting the action the one vehicle is configured to take comprises comparing the evaluation function improvement degrees with each other, which are calculated for each of a plurality of actions that the one vehicle is configured to take.

9. A non-transitory program recording medium recording a program for controlling, at least, one vehicle of unmanned vehicles forming a group of unmanned vehicles, the program causing a computer to execute:

processing of acquiring information on a state of another vehicle;

processing of acquiring a sensor signal containing information on a state of one vehicle;

processing of calculating comparison values for a plurality of kinds of actions that the one vehicle is to take by using acquired information on the one vehicle and the another vehicle;

processing of selecting an action that the one vehicle is to take, based on calculated comparison values for a plurality of kinds of actions;

processing of calculating an operation amount of the one vehicle by using information on the selected action and information on a state of the another vehicle; and processing of setting an operation setting value of an actuator for operating the one vehicle by using the calculated operation amount of the one vehicle, wherein the processing the calculating comparison values comprises generating, for each of the plurality of kinds of actions that the one vehicle is configured to take, a first evaluation function for the operation amount of the one vehicle, based on information on a state of the one vehicle, and a second evaluation function for an operation amount of the another vehicle, based on information on a state of the another vehicle, and calculating, as the comparison values, evaluation function improvement degrees at a time of taking the plurality of kinds of actions that the one vehicle is configured to take, based on the first evaluation function and the second evaluation function, and wherein the processing selecting the action the one vehicle is configured to take comprises comparing the evaluation function improvement degrees with each other, which are calculated for each of a plurality of actions that the one vehicle is configured to take.

10. The non-transitory program recording medium control device according to claim 1, wherein the plurality of kinds of actions comprise searching for a search object, chasing the search object, capturing of the search object, and improvement of a communication situation with the another vehicle.

11. The control method according to claim 8, wherein the plurality of kinds of actions comprise searching for a search object, chasing the search object, capturing of the search object, and improvement of a communication situation with the another vehicle.

12. The non-transitory program recording medium according to claim 9, wherein the plurality of kinds of actions comprise searching for a search object, chasing the search object, capturing of the search object, and improvement of a communication situation with the another vehicle.

* * * * *